United States Patent [19]

Kurr et al.

[11] Patent Number: 4,984,777

[45] Date of Patent: Jan. 15, 1991

[54] FLEXIBLE BEARING WITH A DISK SPRING HAVING AN S-SHAPED SPRING CONSTANT CURVE

[75] Inventors: Klaus Kurr, Weinheim; Hans-Gerd Eckel; Heinz Seifert, both of Laudenbach; Werner Idigkeit, Weinheim; Armin Barth, Gorxheimertal, all of Fed. Rep. of Germany

[73] Assignee: Firma Carl Freudenberg, Weinheim/Bergstrasse, Fed. Rep. of Germany

[21] Appl. No.: 441,378

[22] Filed: Nov. 27, 1989

[30] Foreign Application Priority Data

Nov. 29, 1988 [DE] Fed. Rep. of Germany ....... 3840156

[51] Int. Cl.[5] ......................... B60K 5/12; F16F 13/00
[52] U.S. Cl. .................. 267/140.1; 267/259;
267/140.4; 267/152; 267/162; 267/219;
248/562; 248/621; 248/636
[58] Field of Search ................ 267/140.1, 140.4, 152,
267/158–165, 219, 220, 217, 227, 162, 226, 225,
221, 30–35, 259, 292, 293, 140.3, 121; 248/636,
562, 638, 565, 567, 573, 576, 577, 578, 621;
180/300, 902, 312

[56] References Cited

U.S. PATENT DOCUMENTS

| | | |
|---|---|---|
| 2,274,227 | 2/1942 | Willard . |
| 2,457,058 | 12/1948 | Markowitz ........................ 267/140.3 |
| 2,510,963 | 6/1950 | Dibblee . |
| 2,567,469 | 9/1951 | Borgeaud et al. ...................... 267/33 |
| 2,660,387 | 11/1953 | Roy ................... 248/621 X |
| 2,660,423 | 11/1953 | Roy .................... 267/33 X |
| 2,902,273 | 9/1959 | Hohenner ........................... 267/162 |
| 3,052,435 | 9/1962 | Roller ............................. 248/621 X |
| 3,270,998 | 9/1966 | Keetch .............................. 267/140.3 |
| 3,814,412 | 6/1974 | Britton et al. ........................ 267/152 |
| 3,873,079 | 3/1975 | Kuus .................................. 267/162 |
| 3,874,646 | 4/1975 | Vernier ............................ 267/140.1 |
| 3,883,101 | 5/1975 | Vernier . |
| 3,947,007 | 3/1976 | Pelet . |
| 4,005,858 | 2/1977 | Lochner ........................... 267/140.1 |
| 4,630,807 | 12/1986 | Gaudiau ............................ 267/35 X |
| 4,738,436 | 4/1988 | Loggers ............................ 267/33 X |
| 4,757,982 | 7/1988 | Andrä et al. ................. 267/140.1 X |
| 4,905,955 | 3/1990 | Brizzolesi et al. . |
| 4,907,786 | 3/1990 | Okazaki et al. . |

FOREIGN PATENT DOCUMENTS

| | | |
|---|---|---|
| 1871188 | 7/1986 | European Pat. Off. . |
| 3239787 | 9/1983 | Fed. Rep. of Germany . |
| 3534659 | 4/1987 | Fed. Rep. of Germany . |
| 922441 | 6/1947 | France . |
| 208654 | 10/1985 | Japan . |
| 2180913 | 4/1987 | United Kingdom . |

Primary Examiner—Douglas C. Butler
Attorney, Agent, or Firm—Kenyon & Kenyon

[57] ABSTRACT

A flexible bearing for supporting a body, in particular, for supporting an internal-combustion engine, includes a journal bearing that may be attached to a supporting foundation and a support that may be attached to the engine. An elastic spring is connected between the journal bearing and the support while a bearing spring made of a non-creeping material is connected between the journal bearing and the support in parallel with the elastic spring. The bearing spring comprises at least one disk spring having an S-shaped spring constant curve. The disk spring and the elastic spring have load carrying capacities such that, after the weight of the body to be supported is applied to the flexible bearing, the spring rate of the disk spring is essentially zero and the rubber spring is essentially free of elastic tensions.

19 Claims, 2 Drawing Sheets

FLEXIBLE BEARING WITH A DISK SPRING HAVING AN S-SHAPED SPRING CONSTANT CURVE

BACKGROUND OF THE INVENTION

The invention relates to flexible bearings for supporting a body, such as an internal-combustion engine, for example, and more particularly, to an improved flexible bearing having a thrust bearing and a support connected to each other by an elastic spring made of rubber or other similar material and by a bearing spring made of non-creeping material.

A flexible bearing suitable for use in the bearing arrangement of an internal-combustion engine is disclosed in DE-OS 3534659. The rubber spring and the bearing spring are serially connected and loaded by the of an internal-combustion engine. An increasing amount of settling of the elastomer material that forms the rubber spring occurs after a long service life. Thus, the rubber spring loses more and of its original resilience with use. This loss of resiliency considerably hampers the insulation of noise-generating, high-frequency vibrations of the internal combustion engine.

SUMMARY OF THE INVENTION

Thus, one of the problems to which the invention is directed is provision of a flexible bearing that achieves good insulation of noise-generating vibrations over a very long service life and even if the bearing is subject to ambient temperatures as high as 160° C.

The invention solves this problem by providing a flexible bearing for supporting a body comprising a journal bearing having means for attachment to a supporting foundation and a support having means for attachment to a body to be supported by the flexible bearing. An elastic spring is connected between the journal bearing and the support and a bearing spring made of a non-creeping material is connected between the journal bearing and the support in parallel with the elastic spring The bearing spring comprises at least one disk spring having an S-shaped spring constant curve. The disk spring and the elastic spring have load carrying capacities such that, after the weight of the body to be supported is applied to the flexible bearing, the disk spring has an essentially zero spring rate and the rubber spring is essentially free of elastic tensions.

It is generally known that disk springs made of a non-creeping material, for example, of a fiber-reinforced plastic or of steel, can have a nearly S-shaped spring constant. The spring constant curve is obtained by plotting the force or load imposed on the spring against the corresponding spring deflection, such as shown in FIG. 1 of the attached drawings. In FIG. 1, the S-shaped spring constant curve initially rises steeply until it reaches a generally flat, horizontal area. In this area, considerable deflections are produced, even when the load to be supported undergoes a very insignificant change. With further increasing loads, the spring constant curve then ascends more steeply, which means that larger forces again are required to attain deformations.

A disk spring having such a spring constant curve is used in the present invention. The load carrying capacity of the disk spring is designed to bear the normal operative load, e.g., at least a portion of the weight of the engine in the vibration-free state, such that the resulting deformation of the disk spring falls within the essentially horizontally extending area of the spring constant curve. In this manner, the weight of the internal-combustion engine is almost completely compensated for and, consequently, the noise-generating vibrations excited by the engine and subject to operating connections are insulated in an excellent manner.

When a motor vehicle drives over a road having irregularities of considerable amplitude, its internal-combustion engine can be displaced relative to these bumps. The disk springs used in the flexible bearings must deflect a corresponding degree to avoid striking noises. To accomplish this using a single disk spring for each flexible bearing, the respective diameter of the disk spring can reach considerable values.

For constructional reasons, it is absolutely necessary that the bearing of the invention have small over-all dimensions for most applications. Thus, embodiments of the present invention in which several disk springs are combined into a stack are preferred. Depending on the number of the disk springs contained within the respective spring stack, the magnitude of the spring travel can be adjusted as needed.

The disk springs are made from a non-settling material, for example, a fiber-reinforced plastic or steel. Deflecting metals also can be used. Use of these materials guarantees a nearly constant spring action over long periods of time.

In the flexible bearing of the invention, an elastic spring, which may be made of rubber or similar material, is provided in parallel to the disk spring. It is designed, fitted and adjusted relative to the load-carrying capacity of the disk spring in such a way that, after the weight to be borne is applied, the spring rate of the disk spring is essentially zero and the elastic spring is essentially free of elastic tensions. As a result, when high-frequency vibrations are introduced, corresponding forces are not transferred to the foundation and settling in the elastic spring does not occur.

The disk spring cannot undergo any change in its properties, regardless of the length of the service life and the ambient temperature, because the disk spring is formed and constructed from a non-settling material. Corresponding changes also are not expected to occur in the elastic spring of the invention. When the motor is not running, the elastic spring is free of inner tensions, which means that any manifestations of settling are totally ruled out right from the start. These manifestations do not occur even when the motor is running, as the vibrations of the motor result in an alternate succession of tensile and compressive loading of the elastic bearing, which compensate each other.

Contrary to the non-settling material that forms the disk spring, the material that forms the elastic spring has vibration-damping properties. These properties are not yet effective when small amplitude, noise-generating vibrations are introduced to guarantee that such vibrations are well insulated. On the other hand, the damping properties become more and more manifest, when large-amplitude vibrations are introduced. This contributes to the reduction of resonance increases in the supported engine, when it is turned on or off, or when the motor vehicle drives over irregularities in a road. The properties relating to this feature are further improved by the invention as the elastic spring is connected in parallel to the disk spring. The disk spring is deformed until a progressively rising area of the spring constant curve is reached. The total, available spring action thereby is more rigid when larger-amplitude vibrations are introduced.

The elastic spring can comprise at least two partial springs, which are spaced from one another in the direction of the axis of motion. By this means, the surface of the elastic spring is noticeably enlarged, which contributes to the avoidance of deformation-related overheating. With such a design, it is also possible to provide a damping device in the clearance space between the partial springs to suppress large amplitude vibrations. For this purpose, it has proven effective to enclose the clearance space and fill it with a liquid. The damping device then can comprise hydraulic damping means that interacts with the liquid, such as those generally known and disclosed, for example, in French Pat. No. 922441.

A shear spring made of elastic material also may be inserted between the disk spring and the support and/or the journal bearing such that the compliance of the shear spring is at right angles to the direction of the axis of motion and is greater than that of the disk spring. This further improves the uncoupling or insulation from the foundation of the internal-combustion engine's high-frequency vibrations introduced in the transverse direction.

To achieve a compact bearing construction, it has proven advantageous to superpose the disk spring and the elastic spring along the direction of the axis of motion. With this type of design, it is possible to produce bearings that do not differ significantly from known engine bearings.

In the neutral position of the flexible bearing, a clearance can be provided between the disk spring and the elastic spring into which a projection of the support extends. This prevents any mutual adverse effect on the operation of the disk spring and the elastic spring. In addition, it is possible to provide the projection with a stop face to limit the excursion of the elastic spring. In this manner, overload-related damage to the bearing is prevented reliably.

Furthermore, a uni-directional thrust bearing may be provided between the support and the internal-combustion engine such that the thrust bearing is supported by means of a transverse spring made of elastic material. This further improves the uncoupling of the internal-combustion engine's high-frequency vibrations from the support and, consequently, from the journal bearing at the same time. The uni-directional thrust bearing and the support may be connected to each other, parallel to the transverse spring, by means of a Cardanic-type connecting link, in order to insulate the initial static loads from the transverse spring. Any manifestations of settling of the transverse spring are not apparent, even though it is made from an elastic material. Moreover, the originally existing resiliency remains over long periods of time when the connecting link is essentially inflexible in the direction of the axis of motion of the flexible bearing.

At least one subsection of the transverse spring may be radially enclosed by the support such that two stop faces formed on the transverse spring and the support are provided. The stop faces are mutually opposing and are spaced from each other in the neutral position. By this means, overload-related damage to the transverse spring should be prevented. The stop faces can be spaced apart at different distances in the longitudinal and transverse directions of the engine. The whole spectrum of requirements, which vary in the longitudinal and transverse directions of an internal-combustion engine of a motor vehicle, thus may be taken into consideration.

At least one subsection of the transverse spring may be radially surrounded by the support and a one-piece, integrally-molded segment of the transverse spring extending longitudinally along the support may be provided. In addition to guaranteeing a good relative flexibility, this design further improves the total available mechanical load-bearing capacity. It is expedient to provide at least two such segments mutually opposing each other. By this means, the special application difficulties associated with the motor vehicle environment are taken into consideration.

Further features, advantages and embodiments of the invention are apparent from consideration of the following description, drawings and appended claims.

DETAILED DESCRIPTION

Figure 1:
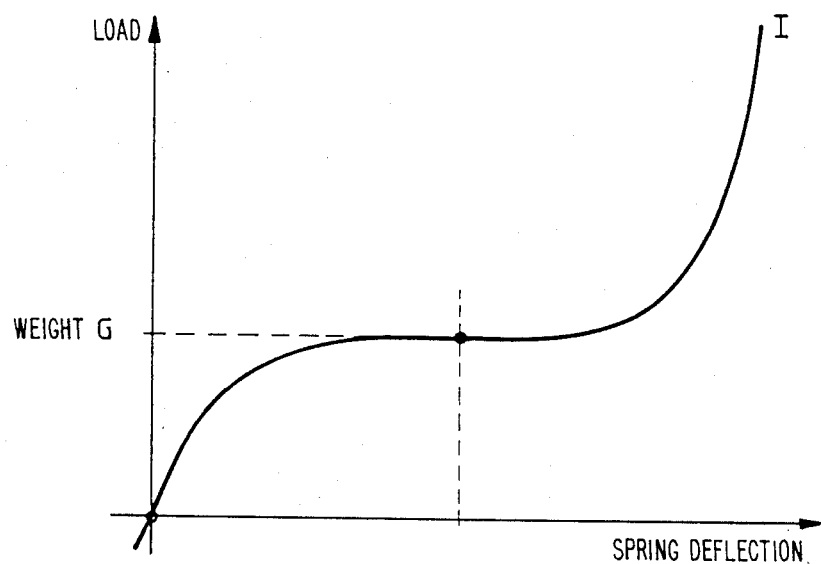
FIG. 1 is a graph illustrating the nearly S-shaped spring constant curve of disk springs used in the flexible bearing of the invention.
Figure 2:
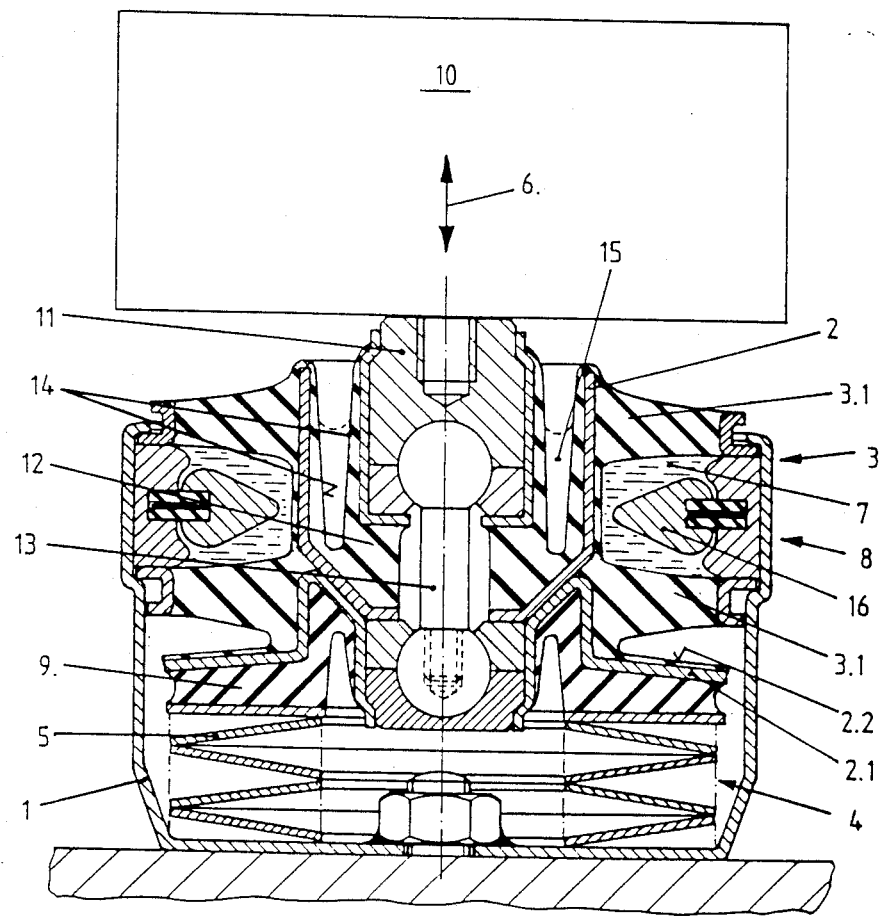
FIG. 2 illustrates a flexible bearing constructed according to the principles of the invention.

The flexible bearing illustrated in FIG. 2 is designed to support at least part of the weight G of an internal-combustion engine 10 of a motor vehicle. The flexible bearing comprises a journal bearing 1 and a support 2, which are connected by an elastic spring 3 made from rubber or similar material and by a bearing spring 4 made from a non-settling material. The rubber spring 3 and the bearing spring 4 are arranged in parallel between these parts. The bearing spring 3 comprises two pairs of disk springs 5, which are bundled together in a stack and arranged one over the other. The disk springs 5 have an S-shaped spring constant curve and a load-carrying capacity selected relative to the load-carrying capacity of the rubber spring 3 such that, after the weight G of the motor 10 is applied, the spring rate of the disk springs 5 is essentially zero and the rubber spring 3 is essentially free of elastic tension. In the illustrated embodiment, the disk springs 5 are made from steel. These disk springs may be guided in plastic rings at their inner and outer circumference and supported against each other.

The disk springs 5 and the rubber spring 3 have a dynamically balanced shape and are concentrically disposed with respect to the axis of motion 6. They may be superposed, i.e., lie one over the other, as illustrated, to provide the bearing with an extremely compact type of construction.

The rubber spring 3 comprises two partial springs 3.1, which are spaced from each other along the direction of the axis of motion and, together with the journal bearing 1 and the support 2, enclose a liquid-filled chamber 7. Hydraulic damping means 16 extend into chamber 7. The hydraulic damping means 16 is fixed to the journal bearing 1 and essentially comprises an annular member, whose inner side is closely spaced from the support 2, which has a cylindrical shape in this area. As a result of the gap which is thereby formed, the liquid bordering both sides of the annular member enclosed in the chamber 7 is able to flow back and forth nearly undamped, when high-frequency, small-amplitude vibrations in the range of 0.1 mm maximum are introduced to insulate such vibrations. If, on the other hand, vibrations of a considerable amplitude, which can lie in the range of one or several millimeters, are produced by the supported engine 10, the amount of liquid displaced is too great to flow unobstructed through the gap, thereby resulting in a substantial damping action. Therefore, contrary to the above-described small-amplitude vibrations, large-amplitude vibrations are subjected to a substantial damping action.

A shear spring 9 made of an elastic material is provided between the stack of disk springs 5 and the support 2 such that the compliance of shear spring 9 is diagonal to the direction of motion 6 and is greater than that of the disk springs 5. In this manner, noise-qenerating vibrations of the supported engine 10 that are introduced in the transverse direction are insulated very well and kept away from the journal bearing 1.

In the neutral position depicted, a clearance is provided between the disk spring 5 and the rubber spring 3. A projection 2.1 of the support extends into this clearance. The projection is provided with a stop face 2.2, which serves to limit the displacement of the rubber spring 3.1. In this manner, destruction of the rubber spring due to an overload is prevented.

Furthermore, a uni-directional thrust bearing 11 is provided between the support 2 and the internal-combustion engine 10 such that the thrust bearing 11 is supported by a transverse spring 12 made of an elastic material. This further improves the uncoupling of the high-frequency vibrations introduced in the transverse direction.

The uni-directional thrust bearing 11 and the support 2 are connected in parallel by the transverse spring 12 and a Cardanic-type connecting link 13, which is essentially inflexible in the direction of the axis of motion. For that reason, the transverse spring 12 is not loaded by the weight G of the engine 10 to be supported. Consequently, there is no need to be concerned with settling or changes in the elastic compliance of the transverse spring 12.

To prevent destruction of the transverse spring 12 when transverse movements of too large an amplitude are introduced, the transverse spring and the uni-directional thrust bearing are radially surrounded at a clearance by the support 2 such that mutually opposed, mated surfaces 14 form stop faces. Two opposing recesses 15 are provided between the surfaces 14. Viewed from the top, the recesses have a kidney-shaped outline and extend downward from an annular recess located perpendicularly above. The relative mobility of the thrust bearing 11 in comparison to the rest of the flexible bearing thus is increased in this direction. Perpendicular to this direction, the recesses 15 are separated from each other by web-like portions of the transverse spring 12. In this second direction, the web-like portions provide a certain amount of guidance and elastic support for the thrust bearing 11. This type of construction is provided to arrange the web-like portions diagonal to the direction of the motion. The amount of deflecting movement of the engine caused by the centrifugal force produced when driving the motor vehicle through a curve thereby is reduced.

Due to its compact construction, the depicted flexible bearing can be used efficiently and easily in a bearing arrangement for supporting an internal-combustion engine in a motor vehicle. The performance of the flexible bearing of the invention is constant over long time periods, both with regard to damping low-frequency vibrations and insulating noise-generating, high-frequency vibrations, whereby increased ambient temperatures of up to 160° C. can be handled easily.

What is claimed is:

1. A flexible bearing for supporting a body comprising:
    a journal bearing having means for attachment to a supporting foundation;
    a support having means for attachment to a body to be supported by the flexible bearing;
    an elastic spring connected between the journal bearing and the support, said elastic spring having a first load carrying capacity; and
    a bearing spring made of a non-creeping material connected between the journal bearing and the support in parallel with the elastic spring, said bearing spring comprises at least one disk spring having an S-shaped spring constant curve and a second load carrying capacity, said second load carrying capacity being defined relative to said first load carrying capacity such that, after the weight of a body to be supported is applied to the flexible bearing, said at least one disk spring has an essentially zero spring rate and the elastic spring is essentially free of elastic tensions.

2. The bearing of claim 1 wherein said at least one disk spring comprises a material selected from the group consisting of fiber-reinforced plastic and steel.

3. The bearing of claim 1 wherein said at least one disk spring and said elastic spring are essentially annular in shape and have common axis of motion.

4. The bearing of claim 3 wherein said elastic spring comprises at least two partial springs spaced from each other in the direction of the axis of motion to form a clearance space between the partial springs.

5. The bearing of claim 4 further comprising a damping device provided in the clearance space.

6. The bearing of claim 5 wherein said clearance space is sealed and filled with a liquid.

7. The bearing of claim 6 wherein said damping device comprises means for hydraulically damping vibrations interacting with the liquid in the clearance space.

8. The bearing of claim 1 further comprising a shear spring made of elastic material provided between said at least one disk spring and at least one of the support and the journal bearing, said shear spring having a compliance that is disposed diagonal to the direction of the axis of motion and is greater than the compliance of said at least one disk spring.

9. The bearing of claim 1 wherein said at least one disk spring and the elastic spring are superposed in the direction of the axis of motion.

10. The bearing of claim 9 wherein the flexible bearing has a neutral position and a clearance space is provided between said at least one disk spring and the elastic spring in the neutral position, said support including a projection extending into the clearance space.

11. The bearing of claim 10 wherein said projection comprises a stop face limiting the excursion of the elastic spring.

12. The bearing of claim 1 further comprising a unidirectional thrust bearing provided between the support and a body to be supported by the flexible bearing, said unidirectional thrust bearing being supported by a transverse spring made of elastic material.

13. The bearing of claim 12 further comprising a Cardanic-type connecting link connected between the unidirectional thrust bearing and the support in parallel with the transverse spring.

14. The bearing of claim 13 wherein the connecting link is essentially inflexible in the direction of the axis of motion.

15. The bearing of claim 12 wherein at least one subsection of the transverse spring is radially enclosed by the support and includes a first stop face, said support includes a second stop face, and said first and second stop faces mutually oppose each other and are spaced from each other in a neutral position of the bearing.

16. The bearing of claim 15 wherein the first and second stop faces are spaced apart at different distances in the longitudinal and transverse directions.

17. The bearing of claim 12 wherein at least one subsection of the transverse spring is radially enclosed by the support, said at least one subsection comprises a one-piece, integrally-molded segment extending longitudinally along the support in a neutral position of the bearing.

18. The bearing according to claim 17 wherein said subsection comprises at least two mutually opposing segments.

19. The bearing of claim 1 wherein the body to be supported comprises an internal-combustion engine.

* * * * *

UNITED STATES PATENT AND TRADEMARK OFFICE
CERTIFICATE OF CORRECTION

PATENT NO. : 4,984,777

DATED : January 15, 1991

INVENTOR(S) : Dr. Klaus Kurr et al.

It is certified that error appears in the above-identified patent and that said Letters Patent is hereby corrected as shown below:

Column 1, line 17 should read:

--spring are serially connected and loaded by the weight of an--

Signed and Sealed this

Twenty-eighth Day of July, 1992

*Attest:*

DOUGLAS B. COMER

*Attesting Officer*     *Acting Commissioner of Patents and Trademarks*